B. D. EMANUEL.
WEIGHING SCALE.
APPLICATION FILED JAN. 20, 1912.

1,074,421.

Patented Sept. 30, 1913.
2 SHEETS—SHEET 1.

WITNESSES:
A. H. Edgerton
O. M. McLaughlin

INVENTOR.
Benjamin D. Emanuel.
BY
H. Lockwood
ATTORNEY.

B. D. EMANUEL.
WEIGHING SCALE.
APPLICATION FILED JAN. 20, 1912.
1,074,421.
Patented Sept. 30, 1913.
2 SHEETS—SHEET 2.
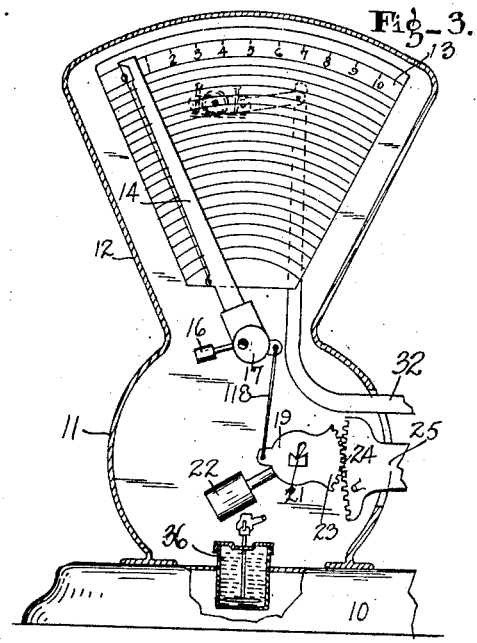
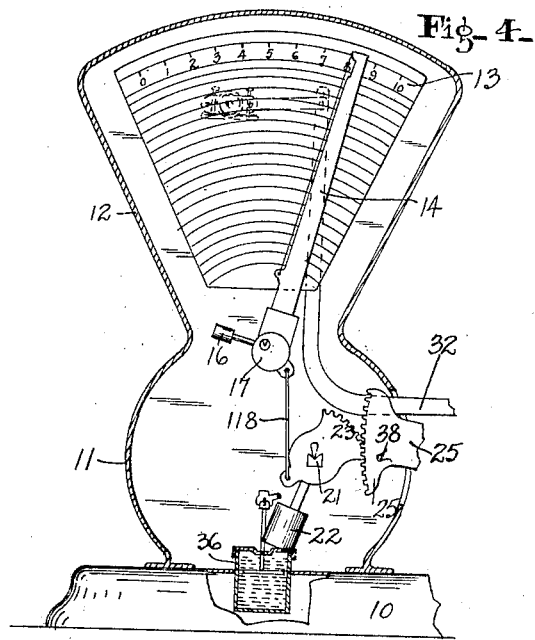
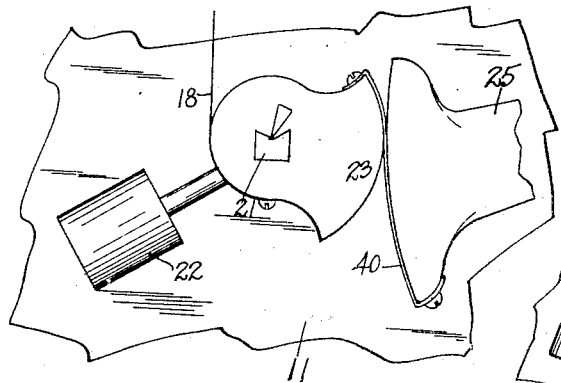
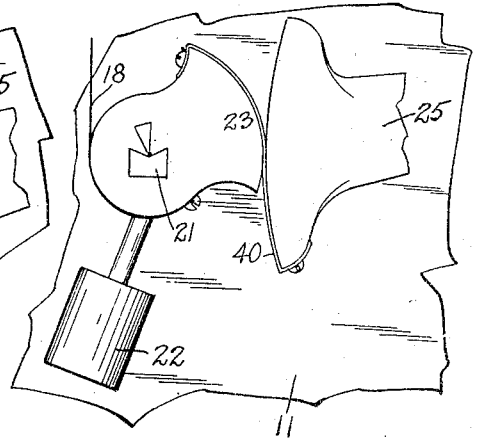
WITNESSES:
INVENTOR.
Benjamin D. Emanuel
BY
ATTORNEY.

UNITED STATES PATENT OFFICE.

BENJAMIN D. EMANUEL, OF ANDERSON, INDIANA.

WEIGHING-SCALE.

1,074,421.

Specification of Letters Patent.

Patented Sept. 30, 1913.

Application filed January 20, 1912. Serial No. 672,484.

*To all whom it may concern:*

Be it known that I, BENJAMIN D. EMANUEL, a citizen of the United States, and a resident of Anderson, county of Madison, and State of Indiana, have invented a certain useful Weighing-Scale; and I do hereby declare that the following is a full, clear, and exact description thereof, reference being had to the accompanying drawings.

The object of this invention is to improve the construction and operation of weighing scales of the pendulum type.

The chief feature of the invention consists in mounting the pendulum independently of the indicator and connecting it directly with the end of the lever.

Along with the foregoing is the further idea of connecting the beam operatively with the pendulum and not with the indicator. When the scale beam is of the first order of leverage, the platform being outside of the fulcrum, the inner end of the scale beam must be weighted to overbalance the platform and when said weighted inner end of the scale beam is operatively carried by the indicator shaft and also the pendulum is connected with the indicator shaft, said indicator shaft carries the indicator, pendulum and weighted end of the scale beam. This places undue load upon the shaft of the indicator, so that it is ordinarily not of sufficient strength to carry such weight and the result is that in such scales, there are frequent complaints of inaccuracy and other trouble due to the fact that such bearings for the indicator shaft become damaged. With this present invention the indicator shaft carries nothing but the indicator and the pendulum is carried by a separate shaft.

While the invention is shown herein with a scale beam of the first order, still it is not necessarily limited to that kind of scale.

The nature of the invention will be understood from the accompanying drawings and the following description and claims.

Figure 1:
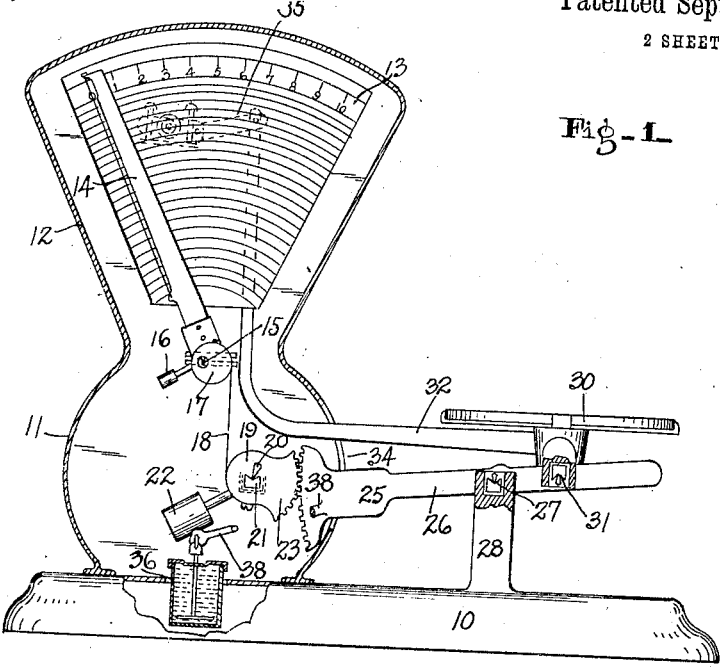
Figure 2:
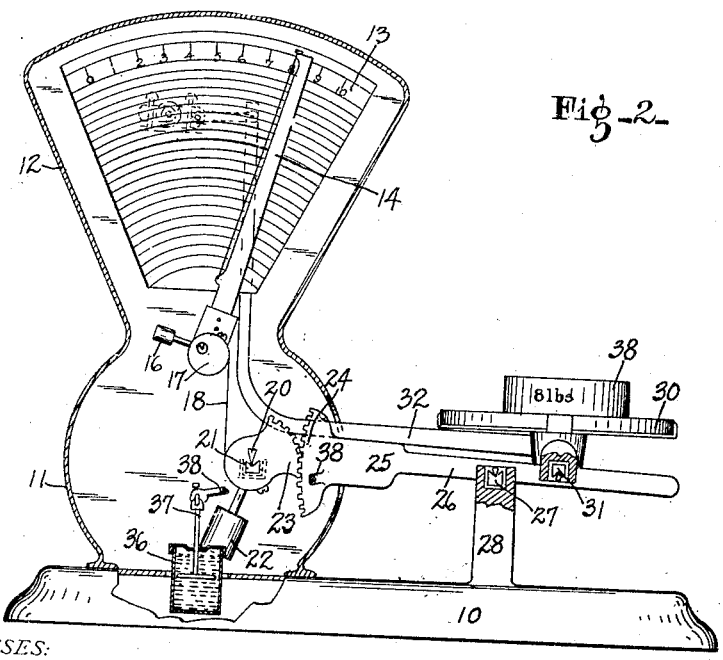

In the drawings, Figure 1 is a front elevation of the scale in one form, showing the scale at zero, and parts being broken away. Fig. 2 is the same with an eight-pound weight on the platform. Fig. 3 is a view of the same as the left-hand half of Fig. 1, with a modified form of the connection between the pendulum and indicator. Fig. 4 is the same as Fig. 3 with the parts actuated as in Fig. 2. Fig. 5 shows the left-hand half of what appears in Fig. 1 with a modified form of the connection between the scale beam and pendulum mounting. Fig. 6 is the same as Fig. 5 with the parts actuated as in Fig. 2.

In the drawings there is a scale with a base 10, a lower substantially cylindrical housing 11 thereon, and an upper fan-shaped housing 12 extending above the lower housing 11. The fan-shaped housing carries a weight chart 13, but the invention is not limited to any particular kind of chart.

The indicator 14 is mounted on the indicator shaft 15 with suitable knife edge bearings in the well known manner, which, however, is not fully shown herein because the same is familiar to all skilled in the art.

16 is a small returning weight for the indicator and extends from its shaft at an angle to the indicator. The indicator shaft has secured on it also a cam disk 17 from which a metal tape 18 extends down to the pendulum shaft 19. This pendulum shaft is mounted by the knife edges 20 on suitable bearing 21. The pendulum 22 extends from the pendulum shaft 19. The pendulum shaft 19 also has secured to it, here integrally, a segmental gear 23 which meshes with a segmental gear 24 on the weighted end 25 of the scale beam 26. The scale beam is fulcrumed at 27 between its ends on the posts 28 from the base. The platform 30 is pivotally supported at 31 on the outer end of the scale beam, beyond the fulcrum thereof, so as to make the scale here shown one of the first principle of leverage.

There is a check bar 32 extending from the platform into the housing through a slot 34 and then is turned upward, as indicated by dotted lines, and its upper end is pivotally connected to a leg 35 which is pivoted to the housing 12. There is also a dash pot 36 with a plunger rod 37 connected with a small arm 38 which extends from the inner end of the scale beam. The upper check and dash pot construction constitute no particular part of this invention.

The weighted end 25 of the scale beam normally holds the pendulum weight 22 in its elevated position and the weight 16 normally holds the indicator at zero. As load is applied on the platform 30, the inner end of the scale beam correspondingly rises and permits the pendulum weight 22 to descend and give the indicator forward movement along the chart 13 so that the chart will indicate the weight of the load. In Fig. 2 there is an eight-pound load 38 on the platform, and the indicator has been moved to the numeral "8" on the chart.

While it is stated above that the pendulum 22 actuates the indicator, that is not wholly true as the weighted end of the lever may coöperate with the pendulum, as in the form herein shown, and cause a positive connection between the weighted end of the lever and the shaft of the pendulum. The upward movement of the weighted end of the lever will positively actuate the indicator in the construction herein shown, but the positive connection between the scale beam and pendulum shaft is not absolutely necessary. The weight 16 should only be heavy enough to return the indicator and not afford any appreciable resistance to the actuation of the indicator by the pendulum. The pendulum travels downwardly in proportion to the load placed upon the platform until equilibrium is reached. The weight 16 and pendulum 22 oppose each other and move in opposite directions.

In the modified form shown in Figs. 3 and 4, a stiff connection or rod 118 is provided between the shaft of the indicator and the shaft of the pendulum instead of the flexible metal ribbon 18, shown in Fig. 1. This enables the weight 16 to be dispensed with as the weight 25 on the inner end of the beam 26 will return the indicator to zero and hold it there because of the positive connection between the parts.

In the modified form shown in Figs. 5 and 6, there is shown a metal ribbon connection between the segmental end 24 of the scale beam and the segmental portion 23 of the pendulum shaft. Instead of the gearing shown in Fig. 1, a metal ribbon 40 is connected at its upper end to the upper part of the segment 23 and the other end of the ribbon is secured to the lower part of the face of the segmental portion 25. The pendulum shaft, by means of its ribbon connection with the scale beam, will be actuated by the weight 25 when there is no load and raise the pendulum 22 to its normal elevated position and hold it there. When a load is placed on the platform, the weight 25 of the scale beam will be accordingly elevated and that will permit the pendulum 22 to descend and correspondingly move its shaft and segment 23, the latter moving upwardly, and such movement of the pendulum will also give the indicator forward movement the same as in Fig. 1. In this form the weight 16 is necessary to return the indicator even if the stiff connection should be provided between the indicator and pendulum because the weighted end of the beam can actuate only in its downward movement in this form and not in its upward movement.

I claim as my invention:

1. A weighing scale including an oscillatory indicator, a weight connected therewith tending to return it to zero, a pendulum fulcrumed separately from said indicator, a connection between the pendulum and indicator arranged so that the indicator will be given its forward movement by said pendulum, a scale beam, means actuated by the scale beam for maintaining the pendulum in an elevated position when there is no load and yielding to the downward action of the pendulum when the load is applied, and means carried by the scale beam for supporting the load.

2. A weighing scale including an indicator, a shaft on which it is mounted, a counter-balance extending from said shaft at such an angle to the indicator that it will tend to return the indicator to zero, a pendulum, a shaft independent of the indicator shaft to which the pendulum is secured, a flexible connection between said two shafts whereby the downward movement of the pendulum will tend to give the indicator a forward movement, a segmental gear secured to the pendulum shaft, a scale beam fulcrumed between its ends with the end adjacent said indicator shaft weighted and provided with a segmental gear meshing with the segmental gear on the indicator shaft and geared so that when the weighted end of the scale beam is in its downward position the pendulum will be elevated, and means on the outer end of the scale beam for supporting the load.

In witness whereof, I have hereunto affixed my signature in the presence of the witnesses herein named.

BENJAMIN D. EMANUEL.

Witnesses:
 G. H. BOINK,
 O. M. MCLAUGHLIN.